Patented June 6, 1944

2,350,368

UNITED STATES PATENT OFFICE 2,350,368

MINERAL OIL LUBRICANT

Orland M. Reiff, Woodbury, N. J., assignor to Socony-Vacuum Oil Company, Incorporated, New York, N. Y., a corporation of New York No Drawing. Application April 23, 1940,
Serial No. 331,230

12 Claims. (Cl. 252—46)

This invention relates to mineral oil compositions and is more particularly related to mineral oil compositions of the lubricant type to which an agent has been added for the purpose of improving the oil in certain respects. It is an object of this invention to provide a novel class of mineral oil addition agents which will improve one or more important properties of a mineral oil fraction. It is a further object to provide mineral oil compositions containing such improving agents.

More specifically, the present invention is directed generically to the oil-miscible substantially stable sulfides, selenides or tellurides of the acylated hydroxyaromatic hydrocarbons and preferably the inorganic acid esters of such hydroxyaromatic hydrocarbons (or condensates thereof), as mineral oil-improving agents, the miscibility in mineral oil being obtained preferably by an alkyl substituent in the aryl nucleus.

In other words, the addition agents of the present invention are oil-miscible substantially stable aromatic sulfides, selenides, or tellurides characterized by the presence of an aromatic nucleus having a nuclear hydrogen replaced by an ester group. Also, the addition agents of the present invention are preferably further characterized by the substitution of at least one nuclear hydrogen atom with an oil-solubilizing substituent. This solubilizing substituent is preferably an alkyl group. Other nuclear substituents may also be present as explained further on.

The addition agents of the present invention are considered to be condensation products wherein two or more of the aromatic nuclei of the characterizing acylated hydroxyaromatic groups are presumably interconnected through a linkage (or linkages) comprised of an element selected from the group consisting of sulfur, selenium, and tellurium preference being given to sulfur. Through the introduction of sulfur, for example, in the manner or manners to be hereinafter described, I obtain what may be broadly termed a sulfide of an acylated hydroxyaromatic or aroxy-acyl hydrocarbon which may be additionally substituted.

In the preferred multifunctional class of sulfides of the present invention I have found such sulfides to possess increased pour depressant and viscosity index improving properties as well as improved antioxidant properties. The improved antioxidant properties are particularly significant in retarding the development of acidity in certain types of oils and under certain conditions of use.

The condensed preferred nuclear-alkyl-substituted acylated hydroxyaromatic or aroxy-acyl compounds contemplated herein as oil-improving agents, are as aforesaid, condensation products and may be represented by the general formula I
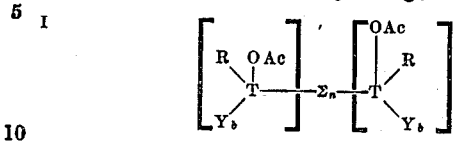

in which T represents a mono- or poly-cyclic aromatic nucleus; $\Sigma$ represents sulfur, selenium, or tellurium; $n$ represents a whole number from one to four; Ac represents the radical of an oxy-acid which remains after removal of an acidic hydroxyl group therefrom; R represents an oil-solubilizing group, preferably at least one alkyl group having at least 20 carbon atoms, and $Y_b$ represents residual hydrogen, additional hydrogen added by hydrogenation, or a substituent attached to the aryl nucleus T, as will be hereinafter more fully described.

For the preferred multifunctional oil-improving agents R represents at least one alkyl group corresponding to a relatively high molecular weight aliphatic hydrocarbon (herein referred to as a heavy alkyl group). This group R should, for the desired multifunctional oil-improving property, be at least one alkyl group containing at least twenty carbon atoms, and, as will hereinafter appear, may preferably be derived from or correspond to the heavy aliphatic hydrocarbons which predominantly characterize an aliphatic hydrocarbon material of the character of petroleum wax.

In addition to the oil-solubilizing alkyl group R, the aryl nucleus may contain residual hydrogen, a part or all of which may, in turn, be substituted with other substituents which may have a positive, or negative, or neutral oil-solubilizing effect. Such residual hydrogen (or additional hydrogen added by hydrogenation) or substituents are, as aforesaid, indicated by $Y_b$ in the foregoing general Formula I, Y representing residual hydrogen, additional hydrogen added by hydrogenation or a substituent attached to the aromatic nucleus selected from the group consisting of hydroxyl, ester group, keto, alkoxy, alkyl sulfide, aryl sulfide, aroxy, ether-alcohol group, aldehyde group, oxime group, aralkyl, aryl, alkaryl, halogen, nitroso, N-thio, N-acyl and cyano substituents and $b$ representing the number of Y's and being equal to zero or a whole number corresponding to the number of replaceable hydrogens not substituted with OAc, $\Sigma_n$ or R.

Examples of acid chlorides of the inorganic acids of non-metallic or acidic metalloid elements that may be used in the acylation reaction mentioned above are the following: $POCl_3$, $PSCl_3$, $BCl_3$, $SiCl_4$, $PCl_3$, $PCl_5$, as well as the corresponding bromides and iodides.

In general, as previously indicated, any acid chloride or anhydride of an inorganic acid may be employed in the esterification reaction which forms a reaction product which is substantially stable toward mineral oils when intimately admixed therewith.

Representative examples of the organic acyl halides which may be used for this purpose are the acyl halides of the following organic acids:

(1) Saturated aliphatic mono carboxylic acids ranging from acetic to montanic acid.

(2) Unsaturated aliphatic monocarboxylic acids such as acrylic, oleic, elaidic, crotonic, etc.

(3) Saturated aliphatic polycarboxylic acids such as succinic, oxalic, adipic, sebacic, etc.

(4) Unsaturated aliphatic polycarboxylic acids such as maleic and fumeric acids.

(5) Substituted mono and polycarboxylic aliphatic acids containing halogen, hydroxyl, amino, ether or keto groups such as chloracetic acid, hydroxystearic acid, tartaric acid, glycollic acid, octyloxyacetic acid and pyroracemic acid.

(6) Aromatic monocarboxylic acids such as benzoic and naphthoic acids.

(7) Aromatic polycarboxylic acids such as phthalic acid.

(8) Alkylene-substituted aromatic monocarboxylic acids such as cinnamic acid.

(9) Aryl substituted mono and polycarboxylic aliphatic acids with carboxyl in the side chain such as phenylstearic, naphthyl stearic and naphthyl polystearic acids.

(10) Substituted aromatic mono and polycarboxylic acids containing halogen, hydroxyl, amino, alkyl, aryl, aralkyl, keto, nitro and alkoxy in the nucleus, such as chlorbenzoic, salicylic, anthranilic, toluic, phenyl-benzoic, benzoylbenzoic, nitrobenzoic, and anisic acid.

(11) Non benzenoid cyclic mono and polycarboxylic acids such as abietic and camphoric acids, and heterocyclic carboxylic acids such as furoic acid.

Of the above organic acylating agents, those corresponding to the saturated aliphatic and aromatic acids are preferred. In most cases, compounds of higher V. I. can be prepared by use of the dibasic acid chlorides because of the formation of more resinous products thereby.

As aforesaid, the aryl nucleus T may be mono- or polycyclic, corresponding, for example, to phenol, naphthol, or anthrol and their "Y" derivatives. A preferred condensation product of the present invention derived from alkyl-substituted phenol (hydroxybenzene) may, in its simplest form, be represented by the general formula II 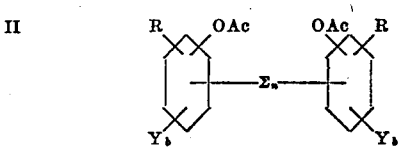

Since the condensation reaction employed in synthesizing the sulfides contemplated herein may be attended by a certain amount of multiple condensation, such condensed compounds, herein called polymers, are included herein within the terms sulfides, etc., and as coming within the general Formula I above. Polymers of this character which may be associated with or formed instead of the simple condensation compound of Formula II may be represented by the general formula:

III 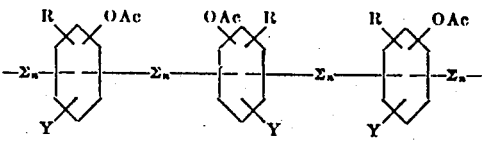

Also, where alkylation of the aryl nucleus has been effected to obtain a multifunctional product by a preferred procedure which involves, among other steps, the Friedel-Crafts condensation of a phenolic (hydroxyaromatic) compound with a halogenated aliphatic hydrocarbon material of at least twenty carbon atoms, such condensation may result in the formation of compounds in which two or more phenolic groups are interconnected by one or more aliphatic hydrocarbon chains. Compounds of this type, when further reacted to obtain the sulfides of phenolic compounds, may result in the formation of compounds corresponding to the formula IV 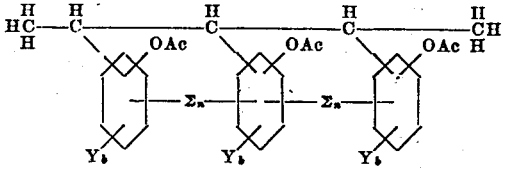

or compounds of the type illustrated by the formula

V 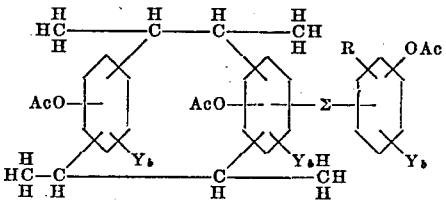

in which the chains correspond to the aliphatic hydrocarbon group R of general Formula I.

The foregoing discussion is not intended as a development of the complete molecular composition or structure of the compound or condensation products constituting the mineral oil addition agents contemplated herein but is considered to be the probable composition and structure of such addition agents. These addition agents may be broadly characterized as the sulfides (or the corresponding selenides or tellurides) of nuclear alkylated acylated hydroxyaromatic hydrocarbons, which may be further substituted, and for purposes of definition and description herein these compounds are represented by general Formula I above, which is inclusive of such sulfides, selenides and tellurides in their simplest form as well as being inclusive of the different nuclear groups which characterize the more complex probably molecular compositions and structures. As aforesaid, the term "sulfide," as used herein, is inclusive of the monosulfides, disulfides, trisulfides, tetrasulfides, etc.; that is, it includes both monosulfides and polysulfides and the corresponding selenides and tellurides and is also intended to include such polymers and related derivatives as are believed to be formed by the hereinafter-described procedures employed to illustrate the synthesis of the addition agents contemplated by this invention. It should be pointed out that the condensed sulfur derivatives or sulfides of the alkylated acylated hydroxyaromatic compounds are the preferred class of addition agents contemplated herein. For that reason the invention is specifically described with reference to the sulfides, but it is to be understood that the corresponding selenides and tellurides are contemplated by and come within the scope of the broad invention.

One general procedure for synthesizing the mono- and polysulfides of the esters of the alkyl-substituted hydroxyaromatic compounds of the type contemplated herein involves the condensation of the corresponding alkylated hydroxyaromatic compounds with sulfur or sulfur halides, followed by the esterification of the hydroxyl group.

In the event sulfur dichloride ($SCl_2$) is used in the general procedure described above, the condensation product will be in the nature of a monosulfide (or a condensate or polymer thereof); sulfur monochloride ($S_2Cl_2$) will yield the corresponding disulfide (or a condensate or polymer thereof) and, of course, a mixture of sulfur halides may be employed to yield a mixture of such sulfides. Elementary sulfur may be employed as the condensation reagent, but this is not considered the most desirable procedure.

Sulfur derivatives of higher sulfur content may be obtained by reacting a compound having a disulfide linkage (obtained with sulfur monochloride) with sulfur or with alkali polysulfides or with an alkyl tetrasulfide. Such higher sulfur derivatives may also be obtained by first reducing the disulfide to form a thio-phenol of the alkylated hydroxyaromatic compound and then reacting the thio-phenol with sulfur dichloride (to form the tetrasulfide) of the alkylated hydroxyaromatic compound, which can then be acylated as indicated above.

The alkylated hydroaromatic compounds (or alkali metal phenate thereof) used in the above general procedure in preparing the sulfides of the corresponding acylated derivatives may be obtained in various ways. For example, a hydroxyaromatic compound such as phenol or naphthol may first be alkylated to substitute part of the nuclear hydrogen with an alkyl group or groups of sufficient size to impart oil-miscibility to the ultimate product. This alkylated hydroxyaromatic compound may then be used as the starting material in the above general procedure or, if desired, it may be converted to an alkali-phenate, by substituting the hydrogen of the hydroxyl group with an alkali metal, which may also be employed as the starting material, as explained above.

The alkylation of the hydroxyaromatic compound may be carried out in various ways. A preferred procedure is to subject a hydroxyaromatic compound or a mixed alkyl-aryl or aralkyl-aryl ether to a Friedel-Crafts condensation reaction with a halogenated aliphatic hydrocarbon, which for obtaining the preferred multifunctional addition agents should be an aliphatic hydrocarbon containing at least twenty carbon atoms. This alkylation may also be carried out with an unsaturated aliphatic hydrocarbon or with aliphatic alcohols, using $H_2SO_4$ or anhydrous aluminum chloride as a catalyst. In the use of alcohols as alkylating agents however, it is preferred to convert the alcohol to the corresponding halide (or polyhalide) and then condense the alkyl halide with the hydroxyaromatic compound by the Friedel-Crafts reaction. For obtaining the preferred multifunctional addition agents the unsaturated hydrocarbons or aliphatic alcohols should be high molecular weight compounds containing at least twenty carbon atoms such, for example, as eicosylene, cerotene, melene, polymerized isobutylene, etc., or myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petroleum and crystalline petroleum wax or other compounds which will result in relatively long chain aliphatic substituents. Special preference is given to petroleum wax of melting point not substantially less than about 120° F., which is predominantly comprised of aliphatic hydrocarbons having a molecular weight of at least 350 and containing at least twenty carbon atoms.

Hydroxyaromatic compounds which may be used in the alkylation reaction are: mono- or poly-cyclic and mono- or poly-hydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl phenol, anthranol, phenylmethyl naphthol, phenanthrol, anisole, beta naphthyl methyl ether, chlorphenol, and the like. Preference in general is given to the monohydroxy phenols otherwise unsubstituted, particular preference being given to phenol and alpha and beta naphthol. Mixed alkyl-aryl and aralkyl-aryl ethers such as anisole and beta-naphthylmethyl ether are given as examples because, as is well known, the Friedel-Crafts reaction with these ethers is accompanied by a molecular rearrangement, with formation of hydroxyl (phenolic) groups.

Where it is desired to obtain a compound or condensation product in which the aryl nucleus contains in addition to, or instead of, residual hydrogen, a substituent of the type represented in general Formula I by $Y_b$, it is pointed out that with the exception of substituents such as aralkyl, aryl, alkaryl, halogen, hydroxyl, and aroxy, such Y groups are introduced after alkylating the hydroxyaromatic compound. Methods for the introduction of these $Y_b$ substituents into the simpler hydroxyaromatic compounds are well known to those skilled in the art and it has now been discovered that these methods are also applicable to the more complex hydroxyaromatic compounds employed in making the improving agents of the present invention. It should also be pointed out that where nuclear substituents are present containing methylene groups such as alkyl, keto, ether, ester radicals, etc., the same may also carry substituents such as halogen, hydroxyl, N-acyl, cyano, nitro, and thio groups. The methods for introducing these substituents are also well known to those skilled in the art.

To illustrate the procedure which may be followed in preparing the addition agents contemplated by this invention, I will now describe the various steps which may be followed in synthesizing the monosulfide or the disulfide of acylated wax-substituted phenol, which for simplicity is herein termed wax-phenol.

By the term "wax" in this connection I mean, as previously indicated, a mixture of higher aliphatic radicals or groups corresponding to the higher aliphatic hydrocarbons which characterize petroleum wax, the resulting product being, therefore, a mixture of the condensation products, such as the sulfides (mono- or di-) of the corresponding alkylated acylated phenols.

The procedure to be followed in preparing other polysulfides and condensation products containing other alkyl substituents than those derived from petroleum wax and other aryl nuclei than that characterizing phenol will be obvious from the following description in the light of the foregoing.

As aforesaid, condensation products characterized by at least one "wax" substituent (or other equivalent high molecular weight alkyl group) in the aryl nucleus constitute a preferred class because of their multifunctional properties, but the present invention is not limited thereto.

ALKYLATION OF PHENOL

A paraffin wax melting at approximately 120° F. and predominantly comprised of aliphatic compounds having at least 20 carbon atoms in their molecules is heated to about 200° F., after which chlorine is bubbled therethrough until the wax has absorbed from about 10 per cent to about 16 per cent of chlorine, such product having an average composition between that corresponding to a monochlor-wax and a dichlor-wax. A quantity of chlor-wax thus obtained containing 3 atomic proportions of chlorine is heated to a temperature varying from just above its melting point to not over 150° F., and 1 mol of phenol (hydroxybenzene) is admixed therewith. The mixture is heated to about 150° F., and a quantity of anhydrous aluminum chloride corresponding to about 3 per cent of the weight of the chlor-wax in the mixture is slowly added with active stirring. The rate of addition of the aluminum chloride should be sufficiently slow to avoid violent foaming, and during such addition the temperature is preferably held at about 150° F.; after the aluminum chloride has been added, the temperature of the mixture may be increased slowly to control the evolution of HCl gas to a temperature of from 250° F. to 300–350° F. If the emission of HCl gas has not ceased when the final temperature is reached, the mixture may be held at 350° F. for a short time to allow completion of the reaction, but to avoid possible cracking of the wax the mixture should not be heated appreciably above 350° F., nor should it be held at that temperature for any extended length of time. Removal of non-alkylated material (phenol) can be effected generally by water-washing, but it is preferable to treat the water-washed product with super-heated steam, thereby insuring complete removal of the unreacted material and accomplishing the drying of the product in the same operation.

A wax-substituted phenol prepared according to the above procedure in which a quantity of chlor-wax containing 3 atomic proportions of chlorine (16 per cent chlorine in the chlor-wax) is reacted with 1 molecular proportion of phenol, may for brevity herein be designated as "wax-phenol (3–16)." Parenthetical expressions of the type (A–B) will be used hereinafter in connection with the alkylated hydroxyaromatic compounds to designate (A) the number of atomic proportions of chlorine in the chloraliphatic material reacted with one mol of hydroxyaromatic compound in the Friedel-Crafts reaction and (B) the percentage of chlorine in the chloraliphatic material. In the above example A=3 and B=16. The same designation will also apply to the sulfides of the wax-substituted acylated hydroxyaromatic compounds which constitute the ultimate product derived from the wax-phenol.

FORMATION OF THE SULFIDES OF WAX-PHENOL

The sulfides of wax-phenol may be obtained by first dissolving the wax-phenol in a suitable solvent such as carbon disulfide, benzene, chlorbenzene, ethylene dichloride, Stoddard Solvent, or the like, and bringing the temperature of the solution up to about 100° F., which is followed by addition of a sulfur halide (mono- or di-) or mixture of sulfur halides during about a ½ hour period. The mixture may then be held at this temperature for about one hour to complete the formation of the sulfide derivatives. HCl is evolved in the reaction, resulting in fixation of the sulfur in the aryl nucleus. As regards the temperature of the reaction, it is to be understood that the reaction can be carried out at various temperatures from room temperature up to the boiling point of the solvent, but it is preferable for obtaining light-colored products that the temperature be not too high. The addition of the sulfur halide is controlled so as to prevent overheating of the mixture by its heat of reaction. This mixture is then water-washed to remove dissolved hydrochloric acid, and the free phenol may be esterified as hereinafter described, or if desired it may be esterified after conversion to its corresponding alkali phenate type compound, in which case free HCl is not evolved, unless an amount of sulfur halide in excess of the alkali metal content is used, the HCl being converted to alkali metal chloride by reaction with the alkali-phenate. When the alkali-phenate is reacted in the manner just described, solvents such as carbon disulfide and ethylene dichloride must be replaced with solvents such as alcohol, benzene, or chlorbenzene to avoid side reactions with the alkali derivative.

The following example illustrates a preferred method of preparing the phosphite ester of wax-phenol disulfide which is one of the preferred oil-improving agents of the present invention. It is to be understood, however, that my invention is not limited to the details of this specific example which is given merely by way of illustration and from which, taken in connection with the explanations and descriptions given above, the various other procedures and methods which may be followed for making this same product and for making the various other products comprised by the present invention will be apparent to those skilled in the art.

EXAMPLE I

*Preparation of the phosphite ester of wax-phenol disulphide*

Reaction mixture:
    Wax-phenol disulfide _____ mol__ 1
    PCl₃ _____ do____ ⅓
    Ethylene dichloride as solvent____
                        ____part by weight__ 1

The wax-phenol sulfide is dissolved in the ethylene dichloride in a flask equipped with stirrer and reflux condenser and brought to a temperature of about 150° F., followed by addition of the PCl₃. The mixture is then refluxed about one hour to complete the reaction, followed by water washing the mixture and distilling the solvent to obtain the finished product.

The reaction can be carried out also by double decomposition of an alkali phenate sulfide with the inorganic halide. This procedure is used in the preparation of inorganic ester derivatives from less reactive halides such as BCl₃. In this case the ethylene dichloride is replaced by a diluent which is unreactive with the alkali salt, such as chlorbenzene or a mineral oil solvent.

The procedure to be followed in obtaining the corresponding disulfides or esters other than the phosphite ester will be readily apparent from the foregoing to those skilled in the art, as will also the variations in the procedure necessary to obtain the corresponding monosulfide and other polysulfides and of other esters of wax-hydroxyaromatic compounds of the present invention.

Addition agents of the type obtained according to the foregoing procedure may be admixed with mineral oil fractions in minor amounts from about $\frac{1}{8}$ per cent to 10 per cent to obtain mineral oil blends of improved pour point and viscosity index, such oils being thereby also stabilized against those deleterious effects of oxidation which, for example, are manifested in an internal combustion engine by the formation of sludge, acid, and by the formation of "lacquer." These oil blends, in addition to being of improved pour point and viscosity index, therefore, may be used in internal combustion engines and under the conditions of use encountered therein produce a marked decrease in the tendency to form acid and sludge and a further marked decrease in the tendency to cause piston ring-sticking and the filling of the slots in the oil rings with a deposit.

To demonstrate the improved properties obtained in mineral oil blends containing addition agents of the type discussed herein, I have conducted several comparative tests with representative mineral oils alone and with the same oils blended with these improving agents, the results of such tests being disclosed in the following examples.

EXAMPLE TWO

Pour point depression

These tests were conducted with a motor oil having a Saybolt viscosity of 67 seconds at 210° F. and a pour point of +20° F. The pour points of blends formed from this oil and representative sulfides of acylated wax-hydroxyaromatic compounds are listed in Table I below, from which it will be observed that the addition agents contemplated herein, when the aryl nucleus is substituted with wax, are highly effective pour point depressants.

Table I

| Addition agent | A. S. T. M. pour point depressant | | |
|---|---|---|---|
| | 0% | 1/10% | 1/8% |
| | °F. | °F. | °F. |
| None | +20 | | |
| Phosphite ester of wax phenol disulfide (3-16) | +20 | -10 | -15 |
| Silicon ester of wax phenol disulfide (3-16) | +20 | 0 | -15 |
| Thiophosphate ester of wax phenol disulfide (3-16) | +20 | -5 | -15 |
| Phosphite ester of wax alpha naphthol disulfide (3-15) | +20 | | -10 |

EXAMPLE THREE

Viscosity index improvement

The data listed in Table II below showing the effectiveness of the addition agents contemplated herein for improving viscosity index were obtained in the conventional manner from the Saybolt viscosity of the oil and the oil blends at 100° F. and 210° F. The oil used was a viscous mineral oil of the lubricant type.

Table II

| Improving agent | Concen. by weight | S. U. V. at— | | V. I. |
|---|---|---|---|---|
| | | 100° F. | 210° F. | |
| | Per cent | | | |
| None | 0 | 140.7 | 41.8 | 79.3 |
| Phosphite ester of wax phenol disulfide (3-16) | 1 | 157.8 | 43.3 | 90.2 |
| Silicon ester of wax phenol disulfide (3-16) | 1 | 146.5 | 42.6 | 91.3 |
| Thiophosphate ester of wax phenol disulfide (3-16) | 1 | 145.8 | 42.5 | 90.0 |
| Phosphite ester of wax alpha naphthol disulfide (3-16) | 1 | 148.0 | 42.8 | 93.8 |

EXAMPLE FOUR

Operation test

In addition to the foregoing tests I have also made comparative tests between an oil and an oil blend containing representative improving agents of the type contemplated herein to determine the comparative behavior of the unblended oil and the improved oil under actual operating conditions. The tests were carried out in a single cylinder C. F. R. engine operated continuously over a time interval of 28 hours with the cooling medium held at a temperature of about 390° F. and the oil temperature held at about 150° F. The engine was operated at a speed of 1200 R. P. M.

The oil used in the test was a lubricating oil stock of 120 seconds Saybolt viscosity at 210° F., and the conditions observed were:

(a) The extent to which the piston rings were stuck;

(b) The extent to which the slots in the oil rings were filled with deposit;

(c) The amount of carbonaceous deposits in the oil; and (d) The neutralization number or acidity (N. N.) of the oil.

The results obtained in these tests are set forth in Table III below, wherein oil A represents the oil alone; oil B represents the same oil containing 1 per cent of the disulfide of the phosphite ester of wax alpha naphthol (3-15).

Table III

| Oil | Ring condition | | | | | | | | Grams carbon deposit | N. N. |
|---|---|---|---|---|---|---|---|---|---|---|
| | Degrees stuck | | | | | Per cent slots filled | | | | |
| | 1 | 2 | 3 | 4 | 5 | 3 | 4 | 5 | | |
| A | 360 | 360 | 360 | 360 | 360 | 60 | 70 | 80 | 13.3 | 1.8 |
| B | 180 | 0 | 0 | 0 | 0 | 5 | 5 | 0 | 5.3 | 0.8 |

The amount of improving agent used may be varied depending upon the mineral oil with which it is blended and the properties desired in the final oil composition. The sulfide derivatives of alkylated acylated hydroxyaromatic compounds of the type contemplated herein may be used in amounts ranging from 1/16 per cent to 10 per cent and in general, compositions of the desired improved properties may be obtained with amounts in the neighborhood of 1 per cent.

As indicated above, it is important for the obtainment of the multifunctional compounds having pour depressant and V. I. improving action as well as antioxidant action that the characterizing aromatic nucleus of such compounds have at least one alkyl substituent containing at least 20 carbon atoms, but it is to be understood that alkyl substituents corresponding to aliphatic hydrocarbons of lower molecular weight, sufficient only to solubilize the compound or condensation product in mineral oil, may be used as addition agents to retard the deleterious effects of oxidation. For example, the diamyl acylated hydroxyaromatic sulfides may be employed as effective antioxidants.

It is to be understood that while I have described certain preferred procedures which may be followed in the preparation of the sulfide condensation products contemplated herein as oil-improving agents and have referred to various representative constituents in these improving agents, such procedures and examples have been used for illustrative purposes only. The invention, therefore, is not to be considered as limited by the specific examples given but includes within its scope such changes and modifications as fairly come within the spirit of the appended claims.

I claim:

1. An improved mineral oil composition comprising a mineral-oil having admixed therewith a minor proportion of an oil-miscible substantially stable condensation product of an hydroxyaromatic compound in which a part of the nuclear hydrogen is substituted with an alkyl group containing at least twenty carbon atoms and in which the hydroxyl hydrogen of the hydroxyaromatic group is substituted with an acid radical, said condensation product comprising at least two aryl nuclei interconnected through linkage with at least one atom selected from the group consisting of sulfur, selenium and tellurium and said acid radical being the radical of an oxyacid which remains after removal of an acidic hydroxyl group therefrom.

2. An improved mineral-oil composition comprising a mineral oil having admixed therewith a minor proportion of an oil-miscible substantially stable condensation product of a nuclear-alkyl-substituted hydroxyaromatic compound in which the hydrogen of the hydroxy group of the hydroxyaromatic compound is substituted with an acid radical, said condensation product comprising at least two aryl nuclei interconnected by at least one atom of an element selected from the group consisting of sulfur, selenium and tellurium and said acid radical being the radical of an oxyacid which remains after removal of an acidic hydroxyl group therefrom and in which the nuclear-alkyl-substituent is selected from the waxy alkyl groups of petroleum wax.

3. The composition of claim 2 in which the aryl nuclei are phenyl nuclei.

4. An improved mineral oil composition comprising a mineral oil having admixed therewith a minor proportion of an oil-miscible substantially stable condensation product of the type obtained by condensing a nuclear-alkyl-substituted hydroxyaromatic compound with the halide of an element selected from the group consisting of sulfur, selenium and tellurium and esterifying the product thus obtained, the said nuclear-alkyl-substituent containing at least twenty carbon atoms.

5. An improved mineral oil composition comprising a mineral oil having admixed therewith a minor proportion of a substantially stable, oil-miscible condensation product corresponding to the general formula

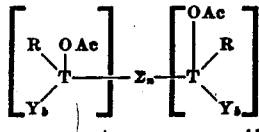

in which T represents an aromatic nucleus; R represents at least one alkyl group having at least twenty carbon atoms; Ac represents the radical of an oxyacid which remains after removal of an acidic hydroxyl group therefrom; Y is selected from the group consisting of hydrogen, hydroxyl, ester group, keto, alkoxy, alkyl sulfide, aryl sulfide, aroxy, ether alcohol group, aldehyde group, oxime group, aralkyl, aryl, alkaryl, halogen, nitroso, N-thio, N-acyl and cyano substituents; $\Sigma$ represents an element selected from the group consisting of sulfur, selenium, and tellurium; $n$ represents a whole number from one to four and $b$ represents the number of Y's and is equal to zero or a whole number corresponding to replaceable hydrogens on the nucleus T not satisfied with R, OAc or $\Sigma_n$.

6. An improved mineral oil composition comprising a mineral oil having admixed therewith a minor proportion of a substantially stable, oil-miscible condensation product corresponding to the general formula

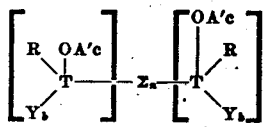

in which T represents an aromatic nucleus; R represents at least one alkyl group having at least twenty carbon atoms; A'c represents the radical of an inorganic oxyacid which remains after removal of an acidic hydroxyl group therefrom; Y is selected from the group consisting of hydrogen, hydroxyl, ester group, keto, alkoxy, alkyl sulfide, aryl sulfide, aroxy, ether alcohol group, aldehyde group, alkaryl, oxime group, aralkyl, aryl, halogen, nitroso, N-thio, N-acyl and cyano substituents; $\Sigma$ represents an element selected from the group consisting of sulfur, selenium, and tellurium; $n$ represents a whole number from one to four and $b$ represents the number of Y's and is equal to zero or a whole number corresponding to replaceable hydrogens on the nucleus T not satisfied with R, OA'c or $\Sigma_n$.

7. The composition of claim 1 in which the oxyacid is an inorganic oxyacid.

8. The composition of claim 1 in which the oxyacid is an inorganic oxyacid and in which the condensation product comprises at least two aryl nuclei interconnected by at least one atom of sulfur.

9. The composition of claim 2 in which the oxyacid is an inorganic oxyacid.

10. The composition of claim 2 in which the aryl nuclei are phenyl nuclei and in which the oxyacid is phosphorous acid and in which the condensation product comprises at least two phenyl nuclei interconnected by two atoms of sulfur.

11. An improved mineral oil composition comprising a mineral oil having admixed therewith a minor proportion of an oil-miscible substantially stable monosulfide of an alkyl-substituted hydroxyaromatic hydrocarbon in which the hydroxyl hydrogen is substituted with the radical of an oxyacid which remains after removal of an acidic hydroxyl group therefrom.

12. An improved mineral oil composition comprising a mineral oil having admixed therewith a minor proportion of an oil-miscible substantially stable polysulfide of an alkyl-substituted hydroxyaromatic hydrocarbon in which the hydroxyl hydrogen is substituted with the radical of an oxyacid which remains after removal of an acidic hydroxyl group therefrom.

ORLAND M. REIFF.

Certificate of Correction

Patent No. 2,350,368. June 6, 1944.

ORLAND M. REIFF

It is hereby certified that errors appear in the printed specification of the above numbered patent requiring correction as follows: Page 2, second column, line 42, Formula V, for "$\Sigma$" read $\Sigma$.

page 3, first column, line 42, for "hydroaromatic" read *hydroxyaromatic*; and second column, line 16, for "petroleum" read *petrolatum*; and that the said Letters Patent should be read with these corrections therein that the same may conform to the record of the case in the Patent Office.

Signed and sealed this 26th day of December, A. D. 1944.

[SEAL]

LESLIE FRAZER,
*Acting Commissioner of Patents.*